(12) United States Patent
Dinger et al.

(10) Patent No.: US 10,024,410 B2
(45) Date of Patent: Jul. 17, 2018

(54) TORQUE TRANSFER DEVICE

(71) Applicant: Schaeffler Technologies AG & Co. KG, Herzogenaurach (DE)

(72) Inventors: Christian Dinger, Lauf (DE); Jan Hoffmann, Rastatt (DE); Stephan Maienschein, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 68 days.

(21) Appl. No.: 15/039,687

(22) PCT Filed: Nov. 28, 2014

(86) PCT No.: PCT/DE2014/200670
§ 371 (c)(1),
(2) Date: May 26, 2016

(87) PCT Pub. No.: WO2015/081954
PCT Pub. Date: Jun. 11, 2015

(65) Prior Publication Data
US 2016/0377158 A1    Dec. 29, 2016

(30) Foreign Application Priority Data
Dec. 2, 2013    (DE) .................. 10 2013 224 671

(51) Int. Cl.
*F16H 45/02* (2006.01)
*F16F 15/14* (2006.01)
*F16D 13/40* (2006.01)

(52) U.S. Cl.
CPC .......... *F16H 45/02* (2013.01); *F16F 15/145* (2013.01); *F16D 13/40* (2013.01);
(Continued)

(58) Field of Classification Search
CPC ............ F16H 45/02; F16H 2045/0205; F16H 2045/0263; F16H 2045/0294; F16F 15/145
See application file for complete search history.

(56) References Cited

U.S. PATENT DOCUMENTS

2011/0192692 A1* 8/2011 Werner ............ F16F 15/12353
192/3.29

FOREIGN PATENT DOCUMENTS

| | | |
|---|---|---|
| EP | 2600031 | 6/2013 |
| JP | 2012077820 | 4/2012 |

* cited by examiner

*Primary Examiner* — Huan Le
(74) *Attorney, Agent, or Firm* — Davidson, Davidson & Kappel, LLC

(57) ABSTRACT

A torque transfer device mountable rotatably around an axis of rotation to transfer a drive torque between an input side and an output side, having a converter wheel of a hydrodynamic converter and a centrifugal force pendulum, which has a pendulum flange extending in an at least partially radial direction and at least one pendulum mass, where the pendulum mass is positioned on a long side of the pendulum flange and is coupled with the pendulum flange by means of a sliding block guide. A first coupling device is designed to provide a connection for transferring torque between the pendulum flange and the converter wheel, where the first coupling device is connected to the pendulum flange at least partially radially to the outside of the pendulum mass to provide an exchange of torque between the converter wheel and the pendulum flange radially to the outside of the pendulum mass.

16 Claims, 3 Drawing Sheets

(52) U.S. Cl.
CPC ............... *F16H 2045/0205* (2013.01); *F16H 2045/0263* (2013.01); *F16H 2045/0294* (2013.01)

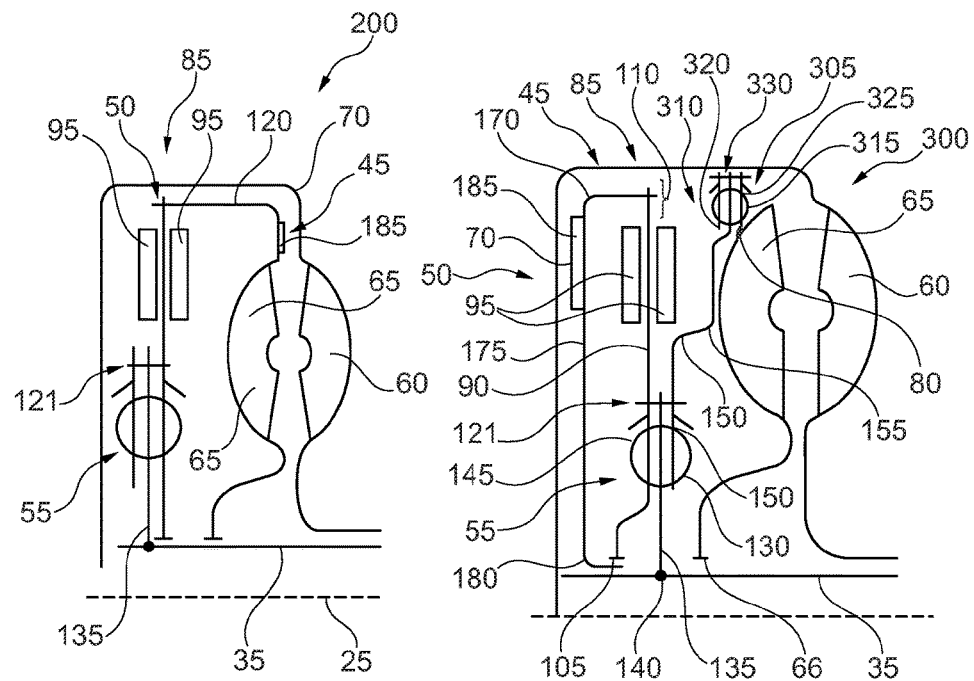
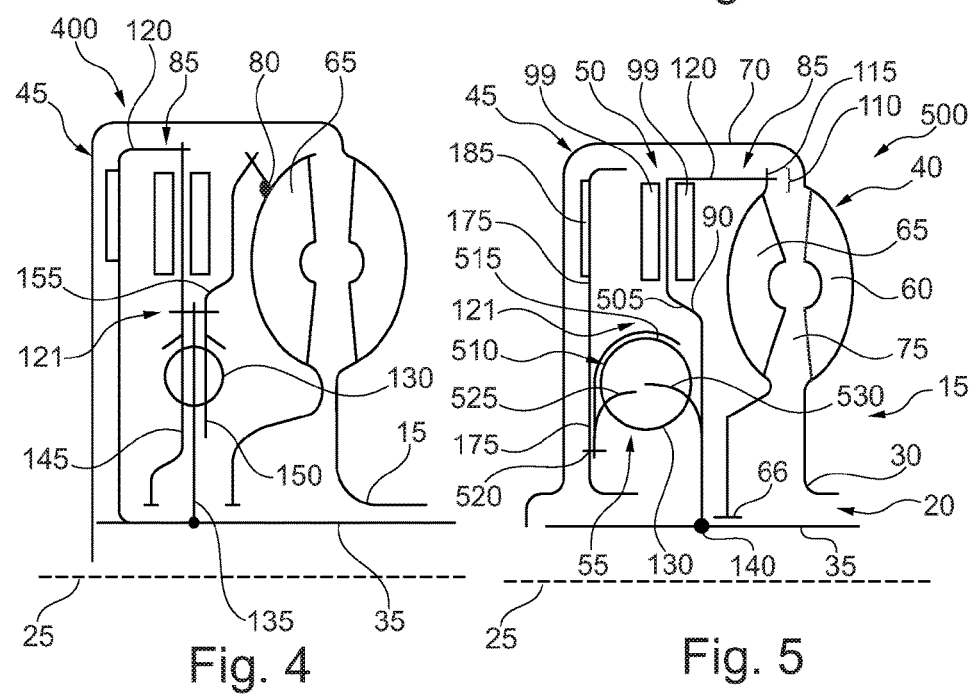

TORQUE TRANSFER DEVICE

The invention relates to a torque transfer device.

BACKGROUND

Torque transfer devices having a centrifugal force pendulum are known, where the centrifugal force pendulum has a pendulum flange and at least one pendulum mass. The pendulum is connected radially on the inner side to a component of the torque transfer device, in order to damp torsional vibrations of a drive torque which is to be transferred by means of the torque transfer device. The pendulum masses usually extend radially all the way outside on the pendulum flange, in order to provide an especially great damping effect of the centrifugal force pendulum.

SUMMARY OF THE INVENTION

It is an object of the present invention to provide an improved torque transfer device.

The present invention provides that an improved torque transfer device can be provided by the torque transfer device being mounted rotatably around an axis of rotation, and being designed to transfer a drive torque between an input side and an output side of the torque transfer device. The torque transfer device has a converter wheel of a hydrodynamic converter, and a centrifugal force pendulum. The centrifugal force pendulum has a pendulum flange which extends at least partially in the radial direction, and at least one pendulum mass. The pendulum mass is situated on a long side of the pendulum flange, and is coupled with the pendulum flange by means of a sliding block guide. Furthermore, a first coupling device is provided, the first coupling device being designed to provide a connection for transferring torque between the pendulum flange and the converter wheel. The first coupling device is connected at least partially radially on the outside of the pendulum mass to the pendulum flange, and is designed to provide an exchange of torque between the converter wheel and the pendulum flange radially outside of the pendulum mass.

As a result, the torque transfer device can be designed especially compactly in the axial direction, while in the radial direction on the other hand the required construction space is utilized especially efficiently.

The additional embodiment includes the torque transfer device, a second coupling device and a damper device. The damper device is designed to damp torsional vibrations in the drive torque being transferred. The second coupling device is situated radially on the inside of the pendulum mass on the pendulum flange, the second coupling device being designed to provide a connection between the damper device and the pendulum flange to the torque exchange between the damper device and the pendulum flange. The second coupling device is preferably situated in a central position in reference to a maximum outside diameter of the pendulum flange. This enables an especially good flow of torque through the pendulum flange to be achieved.

It is especially advantageous if the pendulum flange is connected torsionally to a damper input side of the damper device by means of the second coupling device.

In another embodiment, the converter wheel is designed as a turbine wheel, while the converter includes an impeller. The impeller is positioned axially opposite the turbine wheel. The impeller is torsionally coupled with the input side, while the turbine wheel is connected non-rotatingly to the centrifugal force pendulum by means of the first coupling device.

It is also advantageous if the first coupling device is positioned radially outside with the converter wheel, or centered with the converter wheel in reference to a maximum outside diameter of the converter wheel, or radially inside, preferably on a converter flange.

In order to especially increase the energy efficiency of the torque transfer device, a lockup clutch is provided, the lockup clutch being designed to bridge the converter in order to reduce an inequality of rotational speed between the turbine wheel and the impeller. The lockup clutch is positioned radially outside on the turbine wheel, and connects the pendulum flange torsionally to the turbine wheel through the first coupling device.

In an alternative embodiment, a lockup clutch is provided, the lockup clutch being designed to bridge the converter in order to preferably reduce an inequality of rotational speed between the turbine wheel and the impeller, the centrifugal force pendulum being positioned axially between the lockup clutch and the turbine wheel, the lockup clutch being connected to the pendulum flange through a third coupling device, the third coupling device being connected to the pendulum flange at least partially radially outside of the pendulum mass and being designed to provide an exchange of torque between the pendulum flange and the lockup clutch. This design too is constructed especially compactly.

In another embodiment, the damper device is designed as a spring damper, the spring damper having a retainer and a spring element. The spring element is oriented at least partially in the circumferential direction, and is positioned in the retainer. A damper output side of the spring damper has a plate. The retainer has two bowl-like retainer elements, the plate being positioned axially between the two retainer elements. The second coupling device is designed at least partially as one of the two retainer elements and as part of the pendulum flange. The lockup clutch preferably forms the other of the two retainer elements. As a result, the number of construction elements can be kept especially small, and thus an especially cost-effective torque transfer device can be provided.

It is also especially advantageous for a damper output side of the damper device to be connected torsionally to the output side, or for a damper output side of the damper device to be connected to the output side and torsionally connected to the pendulum flange through the second coupling device.

In another embodiment, the first coupling device includes a coupling bridge and a connection area, the connection area being located on the pendulum flange radially outside of the pendulum mass, the coupling bridge being torsionally connected to the connection area in such a way that the coupling bridge is movable axially relative to the pendulum flange. In this way, an axial movability relative to the pendulum flange can be provided by means of the first coupling device.

BRIEF DESCRIPTION OF THE DRAWINGS

The invention will be explained in greater detail below on the basis of figures. The figures show the following:

FIG. 2 a longitudinal section through a torque transfer device according to a second embodiment;

FIG. 3 a longitudinal section through a torque transfer device according to a third embodiment;

FIG. 4 a longitudinal section through a torque transfer device according to a fourth embodiment;

FIG. 5 a longitudinal section through a torque transfer device according to a fifth embodiment;

DETAILED DESCRIPTION

Figure 1:
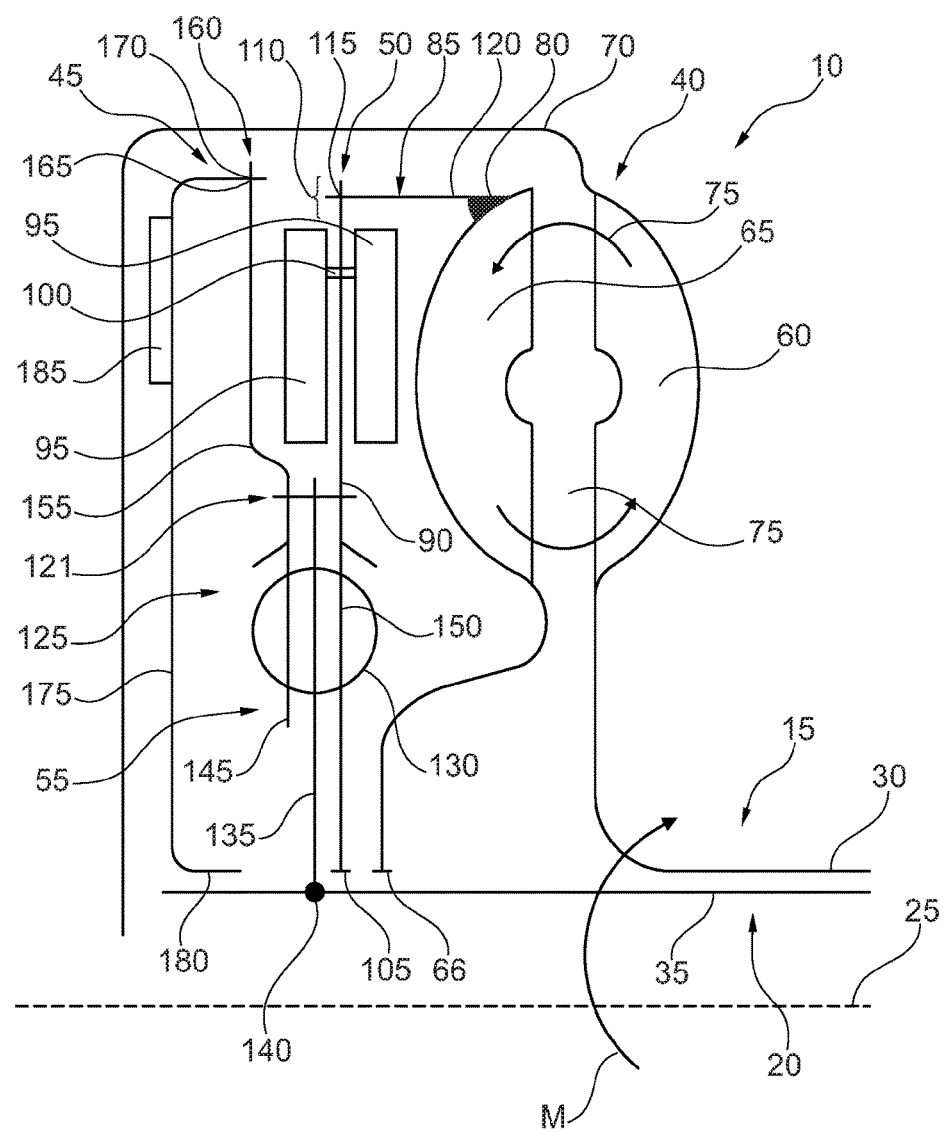
FIG. 1 a longitudinal section through a torque transfer device according to a first embodiment.

FIG. 1 shows a longitudinal section through a torque transfer device 10 according to a first embodiment. The torque transfer device 10 is designed to transfer a drive torque M from an input side 15 of the drive torque 10 to an output side 20. In this case, the torque transfer device 10 is mounted so that it can rotate around an axis of rotation 25. The input side 15, in this case, optionally has an input shaft 30 and the output side 20 has an output shaft 35. The input shaft 30 is designed as a hollow shaft, through which the output shaft 35 is guided.

The torque transfer device 10 also has a hydrodynamic converter 40 and a lockup clutch 45. The lockup clutch 45 has two switch states; in a first switch state the lockup clutch 45 is disengaged and a flow of torque runs through the hydrodynamic converter 40 from the input side 15 to the output side 20. In a second switch state of the lockup clutch 45, the lockup clutch 45 is engaged and bridges the hydrodynamic converter 40. As a result, the torque flow of the drive torque M takes place essentially not through the hydrodynamic converter 40, but through the lockup clutch 45 from the input side 15 to the output side 20. In the bridged state, or second state of the lockup clutch 45, essentially an equality of rotational speed prevails between the input side 15 and the output side 20.

Furthermore, the torque transfer device 10 has a centrifugal force pendulum 50 and a damper device 55. The damper device 55 has a damper input side 56 and a damper output side 57. Both the centrifugal force pendulum 50 and the damper device 55 are designed to damp torsional vibrations in the drive torque M being transferred from the input side 15 to the output side 20. The damper device 55 may, for example, be a spring damper or a dual-mass flywheel, or some other damper device having a separate damper input side 56 and damper output side 57.

The converter 40 has an impeller 60 and a turbine wheel 65. The impeller 60 and the turbine wheel 65 are positioned essentially opposite each other axially. A housing 70 of the torque transfer device 10 is essentially completely flooded with a hydraulic fluid 75. It should be pointed out that the input shaft 30, for example, can be dispensed with if the input side 15 is connected directly to the housing 70, for example by means of a flange (not shown). The direction of flow of the hydraulic fluid 75 between the impeller and turbine wheel 60, 65 is indicated symbolically by means of arrows. But it may also be formed in some other direction, in particular in the opposite direction.

In this case, the turbine wheel 65 is supported on the output shaft 35 by means of a first bearing point 66. The first bearing point 66 is designed here so that an axial movability of the turbine wheel 65 relative to the output shaft 35 is guaranteed. The input shaft 30 may be supported on the output shaft 35, or by means of unshown components of a drivetrain in which the torque transfer device 10 is mounted.

Radially on the outside, the turbine wheel 65 is connected to a first coupling device 85 by means of a first connection 80. In this embodiment, the first connection 80 has the form of a welded connection. It is of course also conceivable for the first connection 80 to also be formed differently, for example by positive locking or material bonding.

The centrifugal force pendulum 50 has a pendulum flange 90 and two pendulum masses 95, each situated on a long side of the pendulum flange 90. The pendulum masses 95 are connected to each other by means of at least one spacing bolt 100 which reaches through the pendulum flange 90. The pendulum flange 90 runs radially outward between the two pendulum masses 95, the pendulum masses 95 being coupled to the pendulum flange 90 by means of a sliding block guide (not shown). The sliding block guide serves to guide the pendulum masses 95 along an oscillation path running in the circumferential direction and/or radial direction, in order to reduce a torsional vibration by a trailing oscillating motion of the pendulum masses 95.

Radially on the inner side, the pendulum flange 90 is supported on the output shaft 35 through a second bearing point 105 so that it is rotatable and axially movable relative to the output shaft 35. Radially to the outer side of the pendulum masses 95, the pendulum flange 90 is connected torsionally to the turbine wheel 65 through the first coupling device 85.

In this case, the first coupling device 85 has, on the pendulum flange 90 radially to the outer side of the pendulum masses 95, a connection area 110 in which, for example, at least one first opening 115 is provided; a coupling bridge 120 of the first coupling device 85 running parallel to the axis of rotation 25 engages the first opening 115. The first opening 115 and a section which engages the first opening 115 are designed so that they correspond to each other. The coupling bridge 120 is coupled by means of the first connection 80 to the turbine wheel 65, so that by means of the engagement of the coupling bridge 120 with the corresponding first openings 115 in the connection area 110 of the pendulum flange 90 an axial misalignment between the turbine wheel 65 and the pendulum flange 90 can be compensated for. A possible tension of the turbine wheel 65 and/or the pendulum flange 90 relative to each other is thereby avoided. It is of course also conceivable for the first coupling device 85 to be designed differently.

Radially to the inside of the pendulum masses 95 a second coupling device 121 is provided, the second coupling device 121 providing a torsional connection between the pendulum flange 90 and the damper input side 56 of the damper device 55. The second coupling device 121 is positioned, for example, at approximately the middle radial height of the pendulum flange 90. Some other arrangement is of course also conceivable.

The damper device 55 includes a retainer 125 and a spring element 130 situated in the retainer 125. The spring element 130 is designed as a bow spring in this embodiment. Differing therefrom, it is also conceivable for the spring element 130 to be of a linear design, for example as a coil spring. In this case, the spring element 130 runs in the circumferential direction. The spring element 130 is fixed in its position by the retainer 125. The damper device 55 also has a disk 135 for the damper output side 57, which is connected torsionally to the output shaft 35 radially on the inner side by means of a second connection 140. The second connection 140 may be designed, for example, as a shaft-to-hub connection.

The retainer 125 has a first bowl-shaped retainer element 145 positioned to the left side of the disk 135, integrated into a disk element 155, and a second retainer element 150 positioned on the right side, axially opposite in reference to the disk 135. The second retainer element 150 is likewise partially bowl-shaped to receive the spring element 130. But, at the same time, the second retainer element 150 is also part of the pendulum flange 90. In this case, the second retainer element 150 is positioned radially to the inner side of the pendulum masses 95 and radially to the outer side in reference to the second bearing point 105. The two retainer elements 145, 150 extend essentially in the axial direction radially to the outer side of the spring element 130. The disk 135 is located axially between the two retainer elements 145, 150. Radially to the outer side between the pendulum masses 95 and the spring element 130, the second coupling device 121 is provided. The second coupling device 121 here couples the damper device 55 with the centrifugal force pendulum 50. Furthermore, the second coupling device 121 couples the two retainer elements 145, 150 with each other.

The disk element 155 extends outward essentially radially, while the first retainer element 145 is positioned radially to the inner side. Radially to the outer side of the first retainer element 145, the disk element 155 extends radially further outward essentially to the level of the first coupling bridge 120. At the same time, a section 156 positioned radially to the outer side of the first retainer element 145 is offset axially away from the pendulum masses 95, in order to provide construction space for the pendulum masses. The disk element 155 has an additional connection area 160 radially to the outside, there being for example two openings 165 provided in the additional connection area 160. The additional connection area 160 is located essentially at the radial level of the connection area 110 on the pendulum flange 90.

The lockup clutch 45 has a clutch plate 175 which extends radially from outside to inside. Radially on the outer side the clutch plate 175 merges into a connection bridge 170 which extends in the axial direction. Radially on the inner side the clutch plate 175 extends to the output shaft 35, on which the clutch plate 175 is supported by means of a third bearing point 180 so that it is movable axially. Furthermore, on a long side of the clutch plate 175 facing the housing 70 a friction lining 185 is provided. FIG. 1 depicts the lockup clutch 45 in the disengaged state. In the engaged state, the lockup clutch 45 is pressed with the friction lining 185 against the inner side of the housing 75 by an actuating device (not shown). To connect the lockup clutch 45 torsionally to the disk element 155 of the damper device 55, the connection bridge 170 engages with the second opening 165, which also runs in the axial direction. The connection bridge 170 and the second opening 165 are matched to each other. This guarantees an axial movability of the clutch plate 175 relative to the disk element 155. Other means of torsionally connecting the clutch plate 175 to the disk element 155 are of course also conceivable.

In the first operating state, in which the lockup clutch 45 is disengaged, the drive torque M is transferred from the input shaft 30 to the impeller 60. In this case, the impeller 60 is integrated into the housing 70. It is of course also conceivable for the impeller 60 to be connected torsionally only to the housing 70. The impeller 60 sets the hydraulic fluid 75 in rotary motion around the axis of rotation 25. When the lockup clutch 45 is disengaged, the hydraulic fluid 75 carries the turbine wheel 65 with it through shear forces and causes it to rotate. As this occurs, the drive torque M being transferred by means of the impeller 60 is introduced into the turbine wheel 65. The drive torque M is further introduced from the turbine wheel 65 through the first connection 80 into the first coupling bridge 120. If the drive torque M has torsional vibration, this is reduced already by the converter 40.

From the coupling bridge 120, the drive torque M is introduced through the connection area 110 radially on the outer side of the pendulum masses 95 into the pendulum flange 90. Independent of the position of the pendulum masses 90 on the oscillation path, the connection area 110 is preferably located radially outside of a maximum radially outer end of the pendulum mass 90. When there are torsional vibrations, the pendulum masses 95 are set by the torsional vibration into oscillating motion, which at least partially damps the torsional vibrations. The drive torque M is further conveyed radially from outside from the connection area 110 of the first coupling device 85 to the inside to the second coupling device 121. The second coupling device 121 introduces the drive torque M into the damper device 55. From the damper device 55 the drive torque M is conducted through the plate 135 out of the damper device 55 and into the output shaft 35.

In the second operating state of the lockup clutch 45, i.e., when the latter is engaged, the torque transfer device 10 has a differently formed torque flow from the input side 15 to the output side 20. The torque flow of the drive torque M takes place from the input shaft 30 through the impeller 60 to the housing 70. When the lockup clutch 45 is in the engaged state, the friction lining 185 presses against the inner side of the housing 70. As a result, the drive torque M is conducted out of the housing 70 into the clutch plate 175 by means of a frictional engagement between the friction lining 185 and the housing 70. Radially on the outer side of the friction lining 185, the clutch plate 175 conducts the drive torque M via the connection bridge 170 and the additional connection area 160 into the disk element 155 of the damper device 55. The drive torque M is introduced into the spring element 130 through the first retainer element 145. The spring element 130 for its part introduces the drive torque M from the spring element 130 into the plate 135, which passes the drive torque M along to the drive shaft 35 through the second connection 140.

This design has the advantage that the centrifugal force pendulum 50, at least in one operating state of the torque transfer device 10, can be used to pass along the drive torque M, and thus the torque transfer device 10 has an especially small need for construction space in the axial direction. Also, since the drive torque M can be introduced into the pendulum flange 90 radially to the outside of the pendulum masses 95, the pendulum flange 90 can be provided with especially low material thickness in order to conduct the drive torque M to the turbine wheel 65 to the damper device 55. The same also applies to the coupling bridge 120 of the first coupling device 85.

FIG. 2 shows a longitudinal section through a torque transfer device 200 according to a second embodiment. The torque transfer device 200 is essentially identical in design to the torque transfer device 10 shown in FIG. 1. Differing therefrom however, the lockup clutch 45 is positioned radially to the outside of the turbine wheel 65, and for its part connects the coupling bridge 120 to the turbine wheel 65. This makes it possible to provide an axially especially compact lockup clutch 45 and an especially compact torque transfer device 200.

It should be pointed out in particular that in both switch states of the lockup clutch 45 the drive torque M is conducted from the lockup clutch 45 through the first coupling device 85 to the centrifugal force pendulum 50 and from the centrifugal force pendulum 50 through the second coupling device 121 to the damper input side 56 and thus into the damper device 55, the drive torque M being introduced from the damper device 55 through the plate 135 as the damper output side 57 into the output shaft 35.

FIG. 3 shows a longitudinal section through a torque transfer device 300 according to a third embodiment. The torque transfer device 300 is essentially identical in design to the torque transfer device 10 shown in FIG. 1. In addition, the torque transfer device 300 has an additional damper device 305 which, similar to the damper device 55, is designed as a spring damper. The additional damper device 305 has an additional retainer 310, in which an additional spring element 315 is positioned. The additional retainer 310 has a third retainer element 320 and a fourth retainer element 325. The retainer elements 320, 325 are bowl-shaped, and are connected to each other radially on the outside by means of a third coupling device 330.

In this case, the additional damper device 305 is positioned radially to the outside of the damper device 55, and partially also radially to the outside of the pendulum masses 95. It is of course also conceivable to position the additional damper device 305 differently. Radially to the inside, the fourth retainer element 325, which faces the turbine wheel 65, is torsionally connected to the turbine wheel 65 by means of the first connection 80. The second retainer element 150 of the damper device 55 is designed in this embodiment as the disk element 155, the disk element 155 engaging with the additional retainer 310. In this case, the disk element 155 has one section positioned axially between the third retainer element 320 and the fourth retainer element 325. The additional spring element 315 here is operatively connected to the disk element 155. On the output side, the disk element 155 couples the additional damper device 305 with the damper input side 56 of the damper device 55.

The pendulum flange 90 of the centrifugal force pendulum 50 is positioned in this case to the left side of the plate 135. The pendulum flange 90 forms part of the first retainer element 145 radially on the inner side. As explained already in FIG. 1, radially to the inner side of the first retainer element 145 the pendulum flange 90 is supported by means of the second bearing point 105; not on the output shaft 35, however, but on the clutch plate 175 or its third bearing 180. It is of course also conceivable for the pendulum flange 90 to be supported directly on the output shaft 35.

In the case, where the lockup clutch 45 is disengaged, the drive torque M is transferred from the turbine wheel 65 to the additional damper device 305. At the same time, the drive torque M is introduced through the third and fourth retainer elements 320, 325 into the additional spring element 315. The additional spring element 315 is tensioned when the drive torque M is introduced, and passes the drive torque M along into the disk element 155. From there, the drive torque M is introduced through the first and second retainer elements 145, 150 into the spring element 130 of the damper device 55. From the spring element 130, the drive torque M is introduced into the plate 135, and from there through the second connection 140 into the output shaft 35. Due to the fact that the centrifugal force pendulum 50 is coupled with the first retainer element 145 through the second coupling device 121, the centrifugal force pendulum 50 is also actuated when the lockup clutch 45 is in the disengaged state, and when torsional vibrations are present in the drive torque M the pendulum masses 95 are excited to vibrate along an oscillation path in order to damp the torsional vibrations.

FIG. 3 shows the lockup clutch 45 in the engaged state, in which the friction lining 185 is in contact with the inner side of the housing 70. In the engaged state, the flow of the drive torque M goes from the impeller 60 through the housing 70 into the lockup clutch 45 and into the clutch plate 175. From there, the drive torque M is introduced radially on the outside through the connection bridge 170 and the connection area 110 of the centrifugal force pendulum 50, which form the first coupling device 85, into the pendulum flange 90. From the pendulum flange 90, the drive torque M is transferred through the second coupling device 121 into the damper device 55, and from there through the plate 135 into the output shaft 35. This design has the advantage that through the additional provision of an additional damper device 305 torsional vibrations in the drive torque M can be reliably damped especially efficiently.

FIG. 4 shows a longitudinal section through a torque transfer device 400 according to a fourth embodiment. The torque transfer device 400 is essentially identical in design to the torque transfer device 300 shown in FIG. 3. Differing therefrom however, the additional damper device shown in FIG. 3 is dispensed with, so that the disk element 155 is connected radially on the outside directly through the first connection 80, and thus the damper input side 56 is also torsionally connected directly to the turbine wheel 65. The drive torque M thus flows from the turbine wheel 65 through the first connection 80 into the second retainer element 150, which in turn conveys the drive torque M further through the second coupling device 121 to the first retainer element 145 and the spring element 130. From the damper device 130 the drive torque M is tapped off through the plate 135 and passed along to the output shaft 35. This design has the advantage that the torque transfer device 400 is designed compactly, especially in the axial direction.

When the lockup clutch 45 is in the second operating state, the torque flow of the drive torque M corresponds to the torque flow in this operating state described in FIG. 1.

FIG. 5 shows a longitudinal section through a torque transfer device 500 according to a fifth embodiment. The torque transfer device 500 represents a combination of the torque transfer devices 10, 200, 300, 400 shown in FIGS. 1 through 4. The torque transfer device 500 has the components shown in FIGS. 1, 2 and 4, but they are connected to each other differently.

In this embodiment, the centrifugal force pendulum 50 is connected to the turbine wheel 65 through the first coupling device 85 positioned radially to the outside of the pendulum masses 95. In this case, the pendulum flange 90 is designed so that it is integrated with the coupling bridge 120 radially to the outer side of the pendulum masses 95, while the coupling bridge 120 engages with the first openings 115, which are located in a connection area 110 radially on the outer side of the turbine wheel 65. As a result, an alternative connection form is exhibited to the connection shown in FIG. 1 between the pendulum flange 90 and the turbine wheel 65 through the first coupling device 85. The form configured here has the advantage that a welded connection to the turbine wheel 65 can be dispensed with. At the same time, the coupling bridge 120 and the pendulum flange 90 can be made, for example, in a punch bending process in a simple manner from a sheet metal part. Furthermore, axial movability of the first bearing point 66 and of the turbine wheel 65 continues to be guaranteed. Radially to the inner side, the pendulum flange 90 is connected to the damper device 55 through the second coupling device 121. In order to guarantee the connection, the pendulum flange 90 has an axial offset 505 here, so as to be able to utilize the construction space especially efficiently in the axial direction. It is of course also conceivable to do without the axial offset 505.

The damper device 55 has a retainer 510 of non-conforming design; the retainer 510 includes only a single retainer element 515 in order to fix the spring element 130. The retainer element 515 grasps the spring element 130 in the form of a bow spring radially on the outside, and thus fixes it in both its axial and radial positions. At the same time, the retainer element 515 is connected to the clutch plate 175 through an additional connection 520, which is located radially to the inside of the spring element 130. Furthermore, a first actuating element 525 is fixed on the clutch plate 175 by means of the additional connection 520. The actuating element 525 rests against a face of the spring element 130, which runs in the circumferential direction. Furthermore, a second actuating element 530 is provided, which is made in a single piece with the pendulum flange 90 and of uniform material. At the same time, it is conceivable for the second actuating element 530 to protrude from the pendulum flange 90 as a tab in the direction of the spring element 130. The second actuating element 530 is positioned in the circumferential direction on an opposite face of the spring element 130 relative to the first actuating element 525. Radially to the inner side, the pendulum flange 90 is connected to the output shaft 35 through the second connection 140.

When the lockup clutch 45 is in the first operating state, i.e., when it is disengaged, the torque flow of the drive torque M takes place from the impeller 60 through the hydraulic fluid 75 to the turbine wheel 65. The turbine wheel 65 passes the drive torque M along radially on the outside through the first coupling device 85 to the coupling bridge 120, which conveys the drive torque M along into the pendulum flange 90. The pendulum flange 90 conducts the drive torque M radially inward to the second connection 140, where it is transferred into the output shaft 35. When the lockup clutch 45 is in the first operating state, the damper device 55 is thus deactivated, since the lockup clutch 45 is disengaged, and thus no companion piece is set against the spring element 130 in order to tension the spring element 130.

When the lockup clutch 45 is in the second switch state, i.e., when it is engaged, the flow of drive torque takes place from the impeller 60 through the housing 70 to the lockup clutch 45. In this case, in the engaged state the friction lining 185 rests against an inner side of the housing 70, so that the drive torque M flows through the friction lining 185 and a frictional engagement between the friction lining 185 and the housing 70 into the clutch plate 175. From the clutch plate 175, the drive torque M is introduced into the damper device 55 by means of the first actuating element 525, into the spring element 130. When this occurs, the spring element 130 is tensioned and serves as an energy storage element, and releases its stored energy through the second actuating element 530. The second actuating element 530 conducts the drive torque M through the pendulum flange 90 and the second connection 140 into the output shaft 35.

This design has the advantage that in one operating state the damper device is deactivated, so that a frequency behavior of the torque transfer device 500 can be changed for this connection case.

Figure 6:
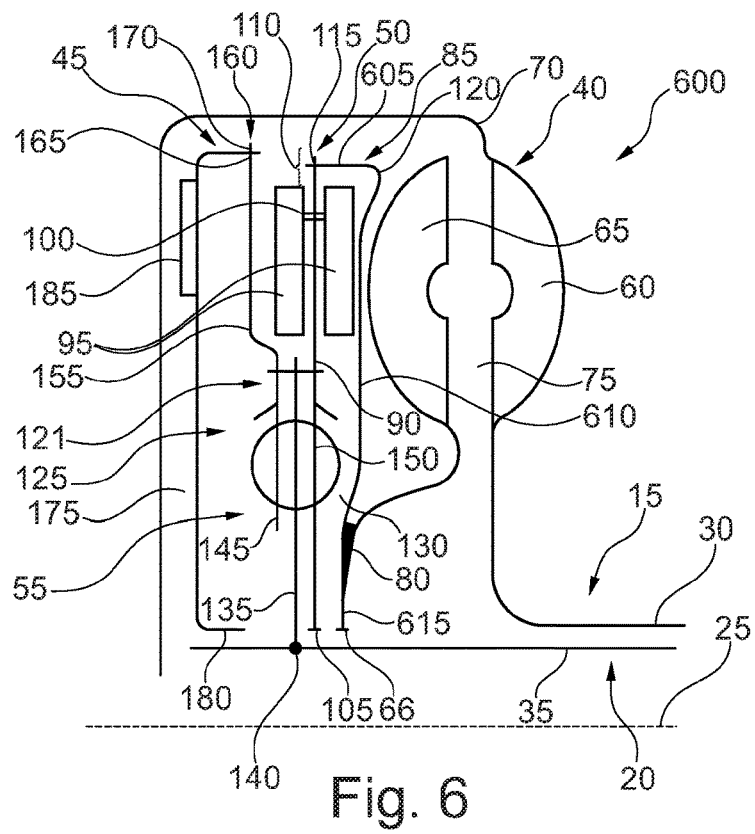
FIG. 6 a longitudinal section through a torque transfer device according to a sixth embodiment.

FIG. 6 shows a longitudinal section through a torque transfer device 600 according to a sixth embodiment. The torque transfer device 600 is essentially identical in design to the torque transfer device 10 shown in FIG. 1. In this case, the coupling element 120 has a first coupling section 605 running in the axial direction and a second coupling section 610 running in the radial direction. The first coupling section 605 is firmly connected radially on the outer side to the second coupling section 610. As a result, the coupling bridge 120 has an essentially L-shaped contour. Radially on the inner side, the second coupling section 610 is connected through the first connection 80 to a turbine flange 615 of the turbine wheel 665, designed as a converter flange. This design makes an especially compact torque transfer device 600 possible. The flow of torque in the torque transfer device 600 is analogous to the description in FIG. 1.

Figure 7:
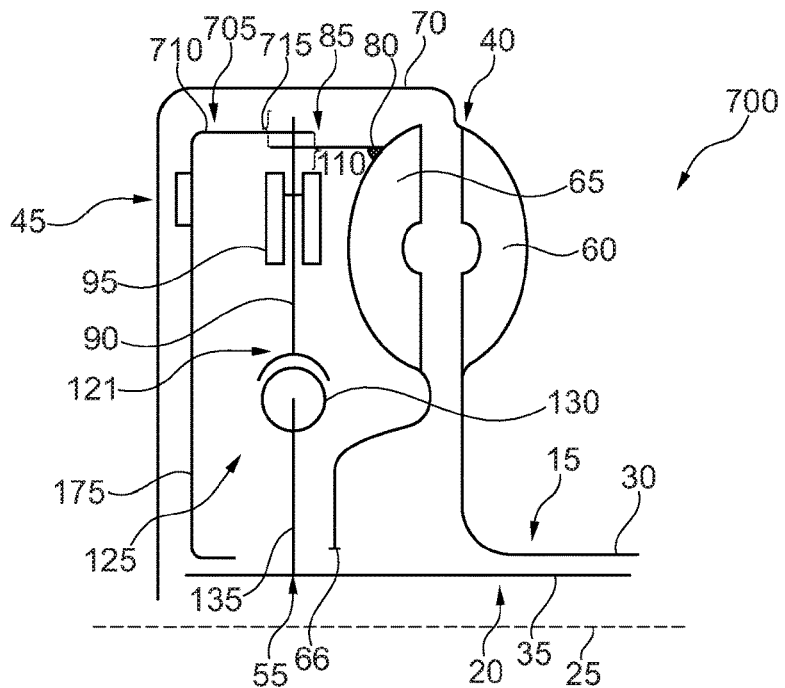
FIG. 7 a longitudinal section through a torque transfer device according to a seventh embodiment.

FIG. 7 shows a torque transfer device 700 according to a seventh embodiment. In this case, the torque transfer device 700 is a combination of the torque transfer device 10 shown in FIG. 1 with regard to the linking of the pendulum flange 90 to the turbine wheel 65 by means of the first coupling device 85. Furthermore, the lockup clutch 45 is connected to the pendulum flange 90 in addition by means of a third coupling device 705. The third coupling device 705 is similar in design to the first coupling device 85, and includes an additional coupling bridge 710. Here, the additional coupling bridge 710 is connected to the clutch plate 175 of the lockup clutch 45. It is especially advantageous here if the clutch plate 175 and the second coupling bridge 710 are produced in a single piece and of a single material, for example of punch-bent sheet metal. The third coupling device 705 has an additional connection area 715 on the pendulum flange 90, radially to the outside of the pendulum masses 95. The additional connection area 715 is analogous in design to the connection area 110, and has openings, for example, with which the coupling bridge 710 engages. The additional connection area 715 is positioned radially to the outside, bordering on the connection area 110. The connection area 110 and the additional connection area 715 may also be positioned so that they overlap radially. This guarantees axial movability of the clutch plate 175 relative to the damper device 55 and of the turbine wheel 65 relative to the centrifugal force pendulum 50. The torque transfer device 55 is essentially identical in design to the torque transfer device shown in FIG. 2.

It should be pointed out that the designs of the first coupling device 85 and/or the third coupling device 705 shown in FIGS. 1 through 7 are examples. It is of course also conceivable for the first coupling device 85 and/or the third coupling device to have a first toothed section in the connection area 110. The coupling bridge 120, 710 has a second toothed section, which is designed corresponding to the first toothed section. The two toothed sections mesh with each other, so that a torsional but axially movable connection between the pendulum flange 90 and the coupling bridge 120, 710 can be provided. Other forms of torsional coupling for the coupling device 85, 705 are of course also conceivable. It is essential here though that the linking by means of the first or third coupling device occurs radially to the outside of the pendulum mass 95 on the pendulum flange 90, and that preferably an axial movability of the converter wheel 60, 65 relative to the pendulum flange 90 or of the clutch plate 175 relative to the pendulum flange 90 is guaranteed.

It should be pointed out that in FIGS. 1 through 7 the input shaft 30 can of course also be exchanged with the output shaft 35, so that the drive torque M is introduced into the torque transfer device 10, 200, 300, 400, 500, 600, 700 through the shaft referred to in the figures as output shaft 35. The result of this is that the function of the impeller 60 and of the turbine wheel 65 are also exchanged, so that the impeller 60 becomes a turbine wheel 65 and the turbine wheel 65 becomes an impeller 60. This design has the advantage that on the input side the torsional vibration of the drive torque M is damped by the centrifugal force pendulum 50.

REFERENCE LABELS 10 torque transfer device
15 input side 20 output side
25 axis of rotation
30 input shaft
35 output shaft
40 hydrodynamic converter
45 lockup clutch
50 centrifugal force pendulum
55 damper device
60 Impeller
65 turbine wheel
66 first bearing point
70 Housing
75 hydraulic fluid
80 first connection
85 first coupling device
90 pendulum flange
95 pendulum mass
100 spacing bolt
105 second bearing point
110 connection area
115 first opening
120 coupling bridge
121 second coupling device
125 Retainer
130 spring element
135 Plate
140 second connection
145 first retainer element
150 second retainer element
155 disk element
160 additional connection area
165 Opening
170 connecting bridge
175 clutch plate
180 third bearing point
185 friction lining
200 torque transfer device
300 torque transfer device
305 additional damper device
310 additional retainer
315 additional spring element
320 third retainer element
325 fourth retainer element
330 coupling device
400 torque transfer device
500 torque transfer device
505 Offset
510 Retainer
515 retainer element
520 additional connection
525 first actuating element
530 second actuating element
600 torque transfer device
605 first coupling section
610 second coupling section
615 turbine flange
700 torque transfer device
705 third coupling device
710 coupling bridge
715 second connection area

The invention claimed is:

1. A torque transfer device mounted rotatably around an axis of rotation to transfer a drive torque between an input side and an output side, the torque transfer device comprising:
a converter wheel of a hydrodynamic converter;
a centrifugal force pendulum having a pendulum flange extending in an at least partially radial direction, and at least one pendulum mass;
the pendulum mass being situated on a radially outer side of the pendulum flange with respect to the axis of rotation and being coupled with the pendulum flange via a sliding block guide; and
at least one first coupling device providing a connection for transferring torque between the pendulum flange and the converter wheel, the first coupling device being connected to the pendulum flange at least partially radially outside of the pendulum mass with respect to the axis of rotation, and providing an exchange of torque between the converter wheel and the pendulum flange.

2. The torque transfer device as recited in claim 1 further comprising a second coupling device and a damper device, the damper device designed to damp torsional vibrations in the drive torque being transferred, wherein the second coupling device is positioned on the pendulum flange radially inside of the pendulum mass with respect to the axis of rotation, wherein the second coupling device is designed to provide a connection between the damper device and the pendulum flange to exchange torque between the damper device and the pendulum flange.

3. The torque transfer device as recited in claim 2 wherein the second coupling device is situated radially between the pendulum mass and a radially inner end of the pendulum flange.

4. The torque transfer device as recited in claim 2 wherein the pendulum flange is torsionally connected to a damper input side of the damper device via the second coupling device.

5. The torque transfer device as recited in claim 2 wherein the damper device has a retainer and a spring element, wherein the spring element is oriented at least partially in a circumferential direction, and is positioned in the retainer, wherein a damper output side of the damper device has a plate, wherein the retainer has a first and a second bowl-shaped retainer element, wherein the plate is positioned axially between the first and second retainer elements, wherein the second coupling device is formed at least partially the first retainer elements and as part of the pendulum flange.

6. The torque transfer device as recited in claim 5 further comprising a lockup clutch, wherein the lockup clutch forms the second retainer element.

7. The torque transfer device as recited in claim 2 wherein a damper output side of the damper device is torsionally connected to the output side, or that the damper output side of the damper device is connected to the output side and torsionally connected through the second coupling device to the pendulum flange.

8. The torque transfer device as recited in claim 1 wherein the converter wheel is designed as a turbine wheel, wherein the converter includes an impeller positioned axially opposite the turbine wheel, the impeller being coupled with the input side, the turbine wheel being connected non-rotatingly to the centrifugal force pendulum via the first coupling device.

9. The torque transfer device as recited in claim 8 further comprising a lockup clutch, the lockup clutch designed to bridge the converter in order to reduce an inequality of rotational speed between the turbine wheel and the impeller, the lockup clutch positioned radially outside on the turbine wheel with respect to the axis of rotation and designed to connect the pendulum flange torsionally to the turbine wheel through the first coupling device.

10. The torque transfer device as recited in claim 8 further comprising a lockup clutch, the centrifugal force pendulum positioned axially between the lockup clutch and the turbine wheel, wherein the lockup clutch is connected to the pendulum flange via a third coupling device, wherein the first coupling device is connected at least partially radially to the pendulum flange on the outside of the pendulum mass with respect to the axis of rotation, and is designed to provide an exchange of torque between the pendulum flange and the lockup clutch.

11. The torque transfer device as recited in claim 10 wherein the lockup clutch is designed to bridge the converter in order to reduce an inequality of rotational speed between the turbine wheel and the impeller.

12. The torque transfer device as recited in claim 1 wherein the first coupling device is positioned radially outside of the converter wheel with respect to the axis of rotation.

13. The torque transfer device as recited in claim 1 wherein the first coupling device is positioned radially inside on a converter flange with respect to the axis of rotation.

14. The torque transfer device as recited in claim 1 wherein the first coupling device includes a coupling bridge and a connection area, wherein the connection area is positioned on the pendulum flange radially to the outside of the pendulum mass with respect to the axis of rotation, wherein the coupling bridge is torsionally coupled with the connection area in such a way that the coupling bridge is movable axially relative to the pendulum flange.

15. The torque transfer device as recited in claim 1 wherein the first coupling device is aligned with an outermost diameter of the converter wheel.

16. The torque transfer device as recited in claim 1 wherein the first coupling device is positioned radially inside of the converter wheel with respect to the axis of rotation.

* * * * *